US006560247B2

United States Patent
Chang et al.

(10) Patent No.: US 6,560,247 B2
(45) Date of Patent: May 6, 2003

(54) DUAL WAVELENGTH OPTICAL FIBER LASER

(75) Inventors: Do-Il Chang, Seoul (KR); Min-Yong Jeon, Taejon (KR); Kyong-Hon Kim, Taejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 09/993,027

(22) Filed: Nov. 5, 2001

(65) Prior Publication Data
US 2002/0080832 A1 Jun. 27, 2002

(30) Foreign Application Priority Data
Dec. 21, 2000 (KR) .......................................... 2000-79764

(51) Int. Cl.[7] .................................................. H01S 3/30
(52) U.S. Cl. .................................... 372/6; 372/6; 372/3
(58) Field of Search ............................... 372/3; 359/346, 359/130, 341.1, 114

(56) References Cited
U.S. PATENT DOCUMENTS 5,623,508 A * 4/1997 Grubb et al. ................... 372/3
5,742,416 A * 4/1998 Mizrahi ....................... 359/130
5,778,118 A * 7/1998 Sridhar ....................... 359/114
5,920,423 A    7/1999 Grubb et al. ................ 359/341
5,959,750 A    9/1999 Eskildsen et al. ........... 359/134
6,163,554 A * 12/2000 Chang et al. ................... 372/3
6,388,806 B1 * 5/2002 Freeman et al. .......... 359/341.1
6,407,855 B1 * 6/2002 MacCormack et al. ..... 359/346

* cited by examiner

Primary Examiner—Paul Ip
Assistant Examiner—Hung T Vy
(74) Attorney, Agent, or Firm—Blakely Sokoloff Taylor & Zafman

(57) ABSTRACT

A dual wavelength optical fiber laser includes a first and a second optical fibers which generating stimulated scattering by a pump light source; two short period optical fiber gratings that is resonating each of a first and a second wavelength light which are generated by the optical fibers and regulating reflecting characteristics according to the first and the second wavelengths; a WDM optical fiber coupler which inputs a pump wavelength to the optical fibers and outputs a laser operation wavelength; and an interference removing unit which is connected between the optical fibers and removes an interference in the first and the second wavelength of resonating.

7 Claims, 5 Drawing Sheets

DUAL WAVELENGTH OPTICAL FIBER LASER

FIELD OF THE INVENTION

The present invention relates to a pump light source for an optical fiber amplifier in a wavelength multiplexing optical communication system; and, more particularly, to a dual wavelength optical fiber laser which forming two independent resonators through two groups of short period gratings and a wavelength division multiplexing (hereinafter, referred to as a WDM) coupler, and removing an interference between the two resonators by using a long period grating.

DESCRIPTION OF THE PRIOR ART

Recently, researches in an ultra wide band light amplifying technology over 1.4 μm~1.6 μm wavelength band by utilizing low loss wavelength band in an optical fiber for obtaining an optical communication speed about dozens of terabit is in progress. An optical fiber Raman amplifier, which is expected to contribute to a long-distant optical communication development, determines an amplifying wavelength band by a pump light so, in case of using a dual wavelength pump light, it can broad the amplifying band easily.

In a conventional method, the dual wavelength pump light source is realized by combining two different output wavelengths of laser diodes or optical fiber lasers.

Generally, the laser diode or the optical fiber laser generates a light in a single wavelength so wavelengths in two independent light sources have to be coupled to form the dual wavelength laser by using a wavelength-multiplexing device.

Hereinafter, a conventional dual wavelength laser operation obtaining method will be described in detail referring to the accompanying drawings.

Normally, the dual wavelength pump light source is realized by combining two different output wavelengths of laser diodes or optical fiber lasers through the wavelength-multiplexing device.

As referred in FIG. 1, in a conventional method, the different two wavelengths realize the dual wavelength laser by using a mach-zehnder field filter.

In FIG. 1, an optical waveguide 11, which has the mach-zehnder form, is used to combine the different two wavelengths $\lambda_1$ and $\lambda_2$. In this case, the optical waveguide 11 uses an interference phenomenon so, an incident light, which has a narrow band and a stable wavelength, is required. To achieve the incident light, the two wavelengths $\lambda_1$ and $\lambda_2$ are stabilized through gratings 12, 13 and then injected to the mach-zehnder optical waveguide 11.

However, an insertion loss is generated for inputting the light into the optical waveguide 11, and when a wavelength changes are happened, a coupling loss in the pump light source is produced due to the interference characteristics of the mach-zehnder filters. Additionally, comparing to the optical fiber, the optical waveguide 11 may be easily damaged when a high power laser is incidented.

FIG. 2 is a diagram showing conventional dual wavelength laser structure using a WDM coupler. Another words, the WDM coupler 21 which is manufactured in an optical fiber fusion method is used for coupling the two different wavelengths $\lambda_1$ and $\lambda_2$, and in this case, a high power operation is possible. However, a WDM coupler for a narrow wavelength band, e.g., a narrow wavelength band smaller than 40 nm is hard to manufacture and shows high loss and polarization dependency, so it is difficult to couple near located two wavelengths.

Also, the methods in FIGS. 1 to 2 need independent two pump sources to realize the dual wavelength laser, so a production cost is increased.

SUMMARY OF THE INVENTION

It is, therefore, an object of the present invention to provide a dual wavelength laser structure which needs no additional pump light source for operating the dual wavelength laser and is not using a mach-zehnder optical waveguide coupler so that an inpsertion loss and a coupling loss in the pump light is solved. Also, an object of the present invention is to provide the dual wavelength laser structure of having relatively simple structure, which is economical and has good high power operation characteristics and two adjacent wavelengths operation is possible.

In accordance with one aspect of the present invention, there is provided a dual wavelength optical fiber laser, comprising: a first and a second optical fibers which generating stimulated scattering by a pump light source; two short period optical fiber gratings that is resonating each of a first and a second wavelength light which are generated by the optical fibers and regulating reflecting characteristics according to the first and the second wavelengths; a WDM optical fiber coupler which inputs a pump wavelength to the optical fibers and outputs a laser operation wavelength; and an interference removing means which is connected between the optical fibers and removes an interference in the first and the second wavelength of resonating.

In accordance with another aspect of the present invention, there is provided a dual wavelength optical fiber laser, comprising: a first and a second optical fibers which generating stimulated scattering by a pump light source; a WDM optical fiber coupler which inputs a pump wavelength to the optical fibers and outputs a laser operation wavelength; a first resonating means which is formed with the first optical fiber and a first group of a short period optical fiber grating, and thereby resonating a first wavelength light which is generated from the first optical fiber; a second resonating means which is formed with the second optical fiber and a second group of a short period optical fiber grating, and thereby resonating a second wavelength light which is generated from the second optical fiber; an interference removing means for removing an interference between the two resonating means by locating between the first and the second resonating means; and a pump light reflecting means which is connected to a laser outputting edge of the WDM optical fiber coupler to reflect a pump wavelength of the pump light source, then re-injected to the first and the second optical fibers.

Preferably, the interference removing means uses a long period optical fiber grating which has high loss to the first wavelength and the second wavelength, simultaneously, and additionally uses long period optical fiber gratings which show high loss to the first wavelength and to the second wavelength, respectively.

Preferably, the first group of the short period optical fiber grating is directly carved to a couple region of the WDM optical fiber coupler.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
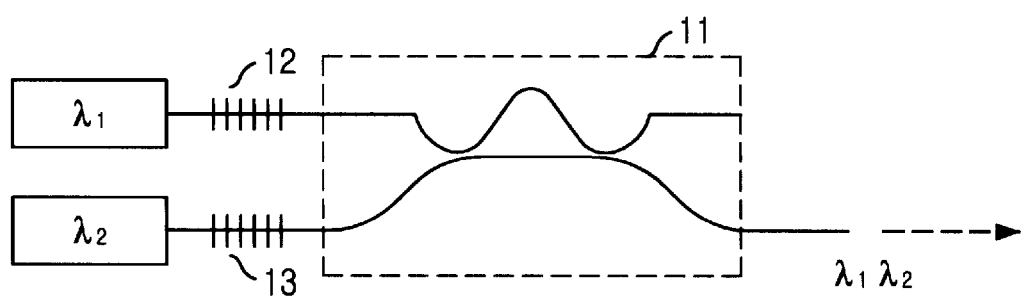
FIG. 1 is a diagram illustrating a conventional dual wavelength laser structure using a mach-zehnder combiner.
Figure 2:
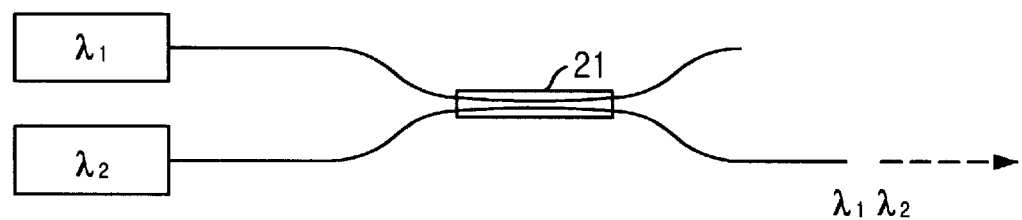
FIG. 2 is a diagram showing a conventional dual wavelength laser structure using a WDM optical fiber coupler.
Figure 3:
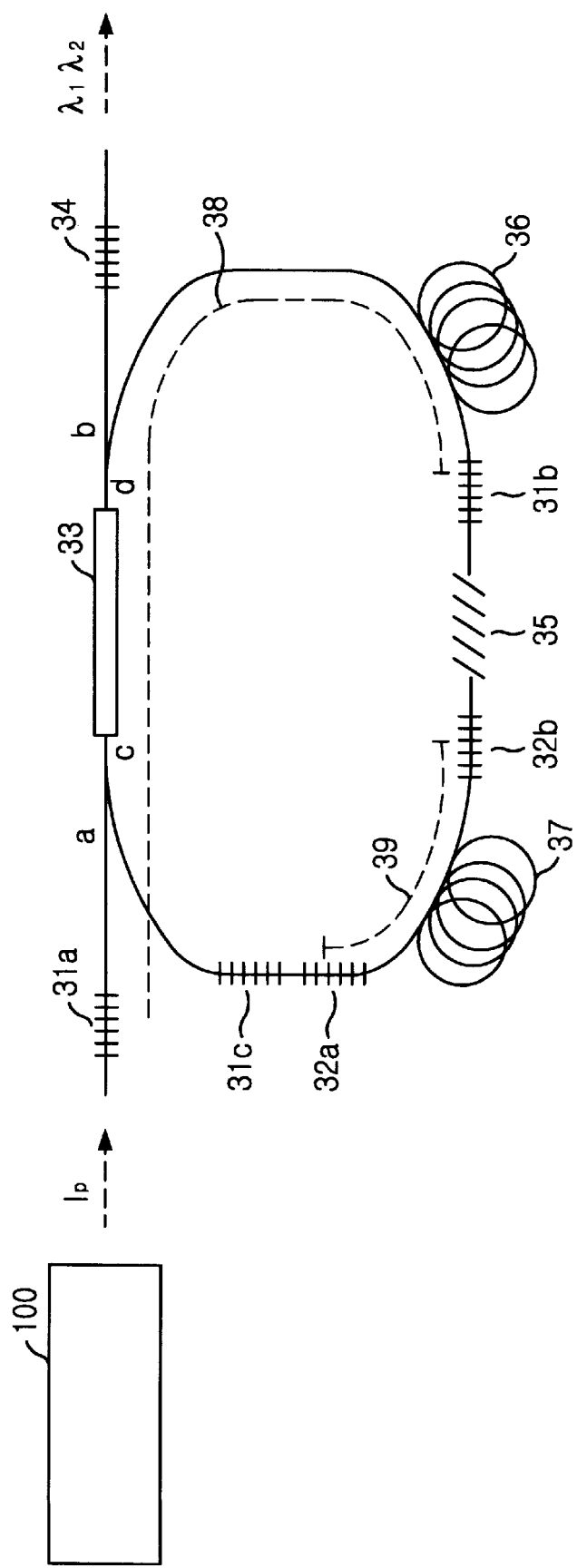
FIG. 3 is a diagram showing a dual wavelength optical fiber Raman laser in accordance with a first embodiment of the present invention.

FIG. 3 is a diagram showing a dual wavelength optical fiber Raman laser in accordance with a first embodiment of the present invention and thereby described a dual wavelength Raman laser for choosing a second Stokes frequency shifted light as an outputting light.

As described in FIG. 3, a first and a second active optical fiber 36, 37 generating stimulated scattering by a pump light source 100, a WDM optical fiber coupler 33 inputs a wavelength of the pump light source 100 by connecting to the first and the second active fibers 36, 37 and outputs a laser oscillation wavelength $\lambda_1$ and $\lambda_2$, a first resonating means 38 which is comprised of the first active optical fiber 36 and a first group of short period optical fiber gratings 31a, 31b, 31c oscillates the first wavelength $\lambda_1$, a second resonating means 39, which is comprised of the second active optical fiber 37 and a second group of short period optical fiber gratings 32a, 32b, oscillates the second wavelength $\lambda_2$, a long period optical fiber grating 35 as an interference removing means which has high loss to the first and the second wavelengths $\lambda_1$, and $\lambda_2$, located between the two resonator means 38, 39 and removes the interference between the two resonator means 38, 39, a pump light reflecting means 34 which is connected to the laser outputting edge of the WDM optical fiber coupler 33 reflects the pump light to re-incident the light to the first and the second active optical fiber 36, 37.

In here, among the short period optical fiber gratings 31a, 31b, 31c, in the first group of the first resonating means 38, the first grating 31a is connected to the inputting edge in the pump light source 100 of the WDM optical fiber coupler 33, the second grating 31b is connected between the first active optical fiber 36 and the long period grating 35, and the third grating 31c is connected between the WDM optical fiber coupler 33 and the second active optical fiber 37, that is, the third grating 31c is connected to the second wavelength inputting edge.

Between the second group of the short optical fiber gratings 32a, 32b of the second resonating means 39, the fourth grating 32b is located between the second active optical fiber 37 and the long period optical fiber grating 35, and the fifth grating 32a is located between the second active optical fiber 37 and the WDM optical fiber coupler 33, more specifically, the fifth grating 32a is located between the third grating 31c which is connected to the second wavelength inputting edge and the second active optical fiber 37.

Furthermore, the first, the second and the third gratings 31a, 31b, 31c and the fourth and the fifth gratings 32a, 32b which are included in the first and the second resonating means 38, 39, respectively, are short period optical fiber gratings, and each of grating has selective reflecting characteristics within an wavelength range of gain of the first and the second active optical fibers 36, 37, respectively.

The pump light reflecting means 34 uses the short optical fiber grating which has the largest reflecting rate to a wavelength of the pump light $I_p$ and the WDM optical fiber coupler 33 provides four ports a to d which are manufactured in an optical fiber fusion method so that it shows a periodic coupling characteristics to the wavelength.

In an exemplary embodiment of the present invention, the pump light source 100 uses a Nd:YLF laser at a length of 1313 nm, the laser operation is realized through stimulated Raman scattering, and the first and the second active optical fibers 36, 37 use Raman optical fiber and select dual wavelength of 1500 nm and 1400 nm which are applicable to a second Stokes frequency shift as the laser oscillation wavelength $\lambda_1$ and $\lambda_2$. In other words, the first group of short period optical fiber gratings 31a, 31b, 31c for selecting the first wavelength $\lambda_1$ are manufactured to show selective reflecting characteristics at a wavelength of 1500 nm and 100% of reflecting rate, and the second group of short period optical fiber gratings 31a, 32b are manufactured to the second wavelength $\lambda_2$ which has a length of 1480 nm to show 90% and 100% of reflecting rate, respectively.

On the other hand, the first resonating means 38 which comprises three of the first group of the short period optical fiber gratings 31a, 31b, 31c and the first active optical fiber 36 uses three of the short period optical fiber gratings in the first group. However, the number of the short period optical fiber gratings can be reduced by craving the short period optical fiber gratings directly to a connecting region of the WDM optical fiber coupler 33 and connect to the first port a and the third port c for performing grating role, simultaneously.

An operation of the above-mentioned dual wavelength optical fiber laser is as below.

The pump light $I_p$ which is outputted from the pump light source 100 is injected into the first port of the WDM optical fiber coupler 33 via the first grating 31a. At this time, the WDM optical fiber coupler 33 shows high coupling ratio (about 100%, refer to FIG. 4) to the wavelength $\lambda_p$ of the pump light $I_p$, so most of the pump light $I_p$ which are injected into the first port a are inputted to the first active optical fiber 36 via the fourth port d.

Subsequently, the pump light $I_p$ which is inputted to the first active optical fiber 36 is injected into the second active optical fiber 37 via the second grating 31b, the long period optical fiber grating 35 and the fifth grating 32b, successively. The light, which is passed the second active optical fiber 37, transmits the third grating 31c and the fourth grating 32a that are connected between the WDM optical fiber coupler 33 and the second active optical fiber 37, and then successively passed the third port c and the second port b of the WDM optical fiber coupler 33. After that, the light is totally reflected by the pump light reflecting means 34, wherein the pump light reflecting means 34 has maximum reflecting rate in the wavelength of the pump light source 100, then re-injected into the first and the second active optical fibers 36, 37.

When the pump light is passed the first and the second active optical fibers 36, 37, coming and going, the laser wavelengths $\lambda_1$ and $\lambda_2$ are oscillated by the stimulated scattering phenomenon, and the oscillating wavelength may be selected by using the short period optical fiber gratings 31a, 31b, 31c, 32a, 32b of the first and the second groups, within the gain range of a laser active medium.

Figure 4:
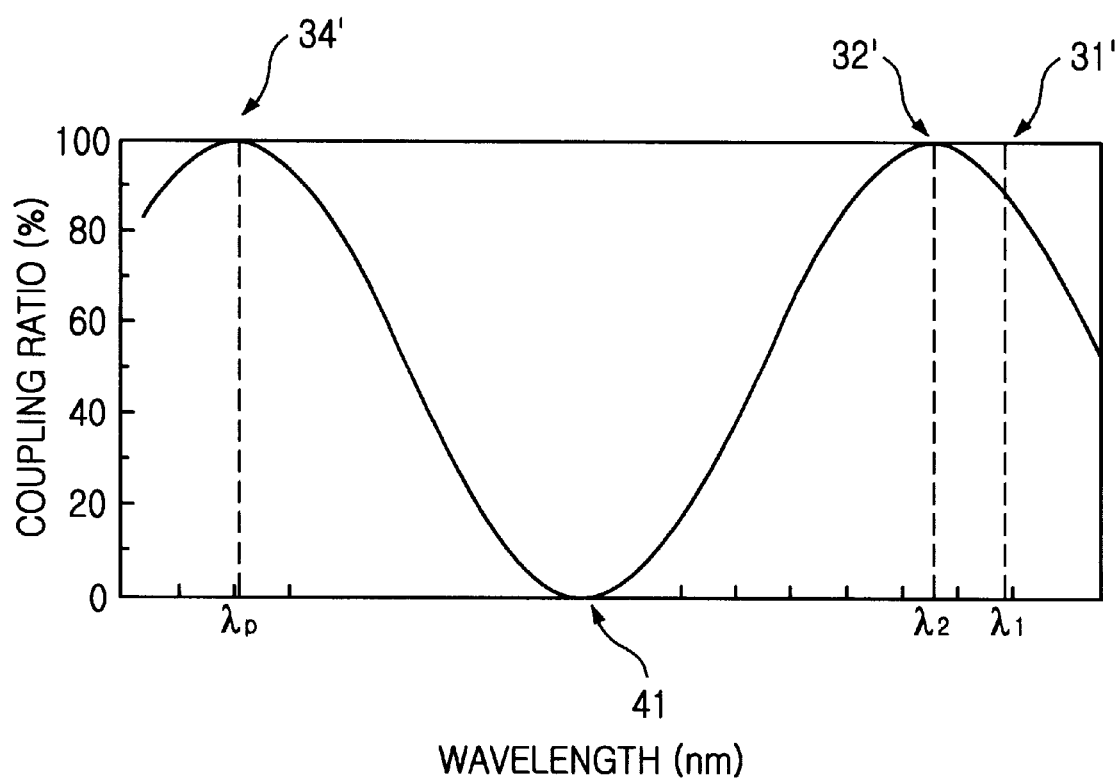
FIG. 4 is a graph showing coupling rate of a WDM optical fiber coupler and reflecting wavelength of a short period optical fiber grating in accordance with a second embodiment of the present invention.

First, in the first resonating means 38, the WDM optical fiber coupler 33 shows lower than 100% to the first wavelength $\lambda_1$ between the first port to the fourth port a to d (refer to FIG. 4). In this case, a laser resonator is formed with the first and the second gratings 31a, 31b and the first active optical fiber 36, and the first wavelength $\lambda_1$ is oscillated through the resonator. At this time, coupling ratio between the first port to the fourth port a to d of the WDM optical fiber coupler 33 is lower than 100%, so part of the light is slipped out from the first resonating means 38, then outputted through the second port b of the WDM optical fiber coupler 33.

Also, the light of the first wavelength $\lambda_1$, which is slipped out through the third port c of the WDM optical fiber coupler 33 is reflected by the third grating 31c then re-injected into the first active optical fiber 36 or the second port b of the WDM optical fiber coupler 33.

Next, the second resonating means 39 is formed by the second active optical fiber 37 and the second group of the fourth and the fifth gratings 32a, 32b of the short period gratings which are located in each edge of the second active optical fiber 37.

The fourth grating 32a which is connected to an edge of the second active optical fiber 37 is manufactured by having lower reflecting ratio than 100% so that it plays role as an outputting coupler in the laser resonator.

A coupling ratio between the second port b and the third port c of the WDM optical fiber coupler 33 to the second wavelength $\lambda_2$ is accorded with a coupling ratio of the first port to the fourth port a to d and manufactured to be 100% (refer to FIG. 4). Therefore, all the power of the second wavelength which is outputted through the fourth grating 32a of side of the second active optical fiber 37 is outputted through the second port b of the WDM optical fiber coupler 33.

Actually, the optical fiber grating and the WDM optical fiber coupler 33 can not be manufactured to have 100% of reflecting rate and coupling ratio, so in this case, a part of light is slipped out due to a defective reflecting rate and coupling rate are injected into a different resonator, then a laser operation is being unsettled. The long period optical fiber grating 35 which has high loss value to the first wavelength $\lambda_1$ and the second wavelength $\lambda_2$, and has low loss value to a wavelength of the pump light source can prevent the above-referenced problem.

In the present invention, the long period optical fiber grating 35 is located between the second grating 31b of the first resonating means 38 and the fifth grating 32b of the second resonating means 39 to remove an interference between the two resonating means 38, 39.

A usage of the long period optical fiber grating 35 is not limited to one. For more stable operation, a long period optical fiber grating which has high loss only to the first wavelength $\lambda_1$ may be added between the third grating 31c and the fourth grating 32a of the WDM optical fiber coupler 33 and the second active optical fiber 37. Also, a long period optical fiber which has high loss only to the second wavelength $\lambda_2$ can be added to the fourth port d of the WDM optical fiber coupler 33.

FIG. 4 is a graph showing coupling rate of a WDM optical fiber coupler and reflecting wavelength of a short period optical fiber grating in accordance with a second embodiment of the present invention.

As described, the WDM optical fiber coupler 33 is designed to have 100% of coupling ratio to the wavelength $\lambda_p$ of the pump light source, to have coupling ratio lower than 100% to the first wavelength $\lambda_1$ and to have 100% of coupling ratio to the second wavelength $\lambda_2$.

In FIG. 4, a dotted line 34' shows reflecting wavelength of a short period optical fiber grating which is used as the pump light reflecting means 34 and a dotted line 31', 32' are show the reflecting wavelength band of the first group of the short period optical fiber gratings 31a, 31b, 31c and the second group of the short period optical fiber gratings 32a, 32b.

The WDM optical fiber coupler 33 shows periodic coupling characteristics according to a wavelength and a wavelength 41 which shows minimum coupling ratio appears once between the pump light wavelength $\lambda_p$ and the power wavelength. However, if the pump light wavelength $\lambda_p$ and the power wavelength have enough space, the WDM optical fiber coupler 33 may be manufactured to have two or more minimum coupling ratio, and with this, the first wavelength $\lambda_1$ is regulated.

Besides, each of the power wavelength can be changed by changing reflecting characteristics of the gratings simultaneously which comprises each of the resonating means 38, 39. However, when changing the wavelength of only one grating among the gratings which realize the resonating means, reflecting characteristics according to the wavelength of the two gratings to form the resonator is not accorded so that laser oscillation condition is not formed and, as a result, an outputting light power of the wavelength is reduced.

In this case, the outputting light power is decreased deviation extends of the reflecting characteristics, according to the wavelength, so controlling oscillated wavelength can control the relative power of the wavelength.

The reflecting characteristics change may changes an outputting wavelength by stretching or compressing the optical fiber gratings.

Figure 5A:
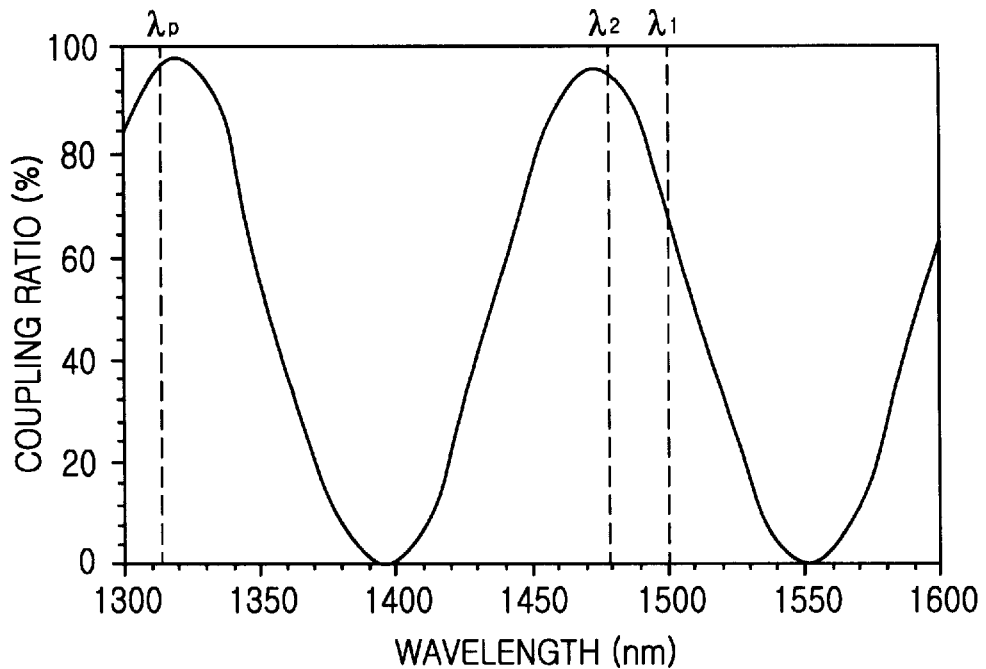
FIG. 5a is a graph showing coupling characteristics according to the WDM optical fiber coupler in accordance with a third embodiment of the present invention.
Figure 5B:
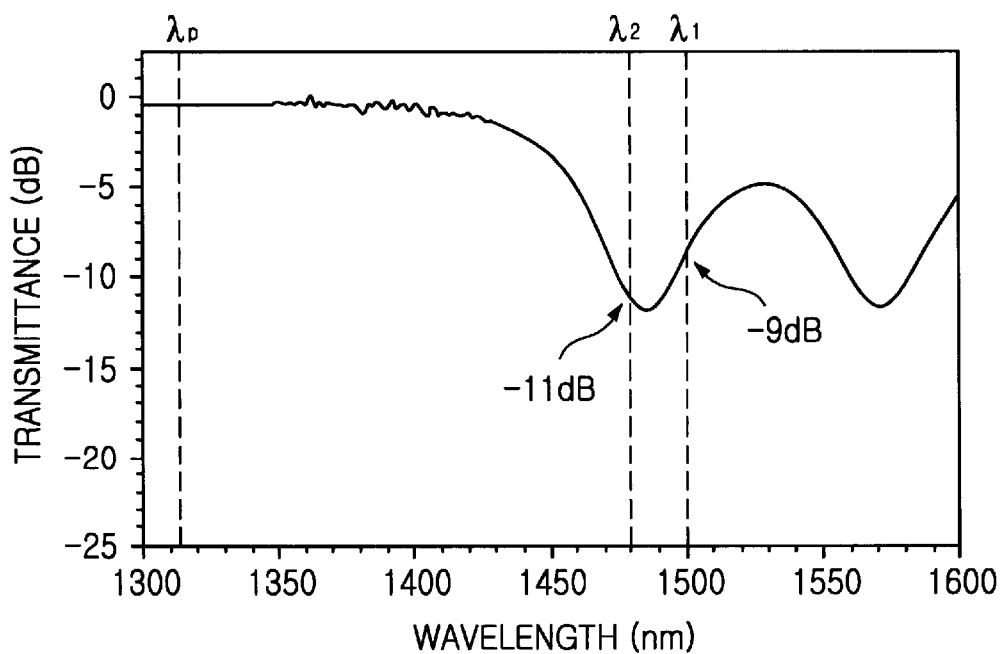
FIG. 5b is a graph showing a permeability according to a long period optical fiber grating wavelength in accordance with a fourth embodiment of the present invention.

FIGS. 5A and 5B describe the characteristics of the WDM optical fiber coupler 33 (FIG. 5A) and the long period optical fiber grating (FIG. 5B) for using in a dual wavelength cascade Raman optical fiber laser which is outputted 1480 nm wavelength band and 1500 nm wavelength band of second Stokes frequency shift.

FIG. 5A is a graph showing coupling characteristics according to the WDM optical fiber coupler in accordance with a third embodiment of the present invention and FIG. 5B is a graph showing a transmittance according to a long period optical fiber grating wavelength in accordance with a fourth embodiment of the present invention.

As described in FIG. 5A, the WDM optical fiber coupler 33 shows about 100% of coupling characteristics to the pump wavelength $\lambda_p$ of 1313 nm and the second wavelength of 1480 nm and shows about 70% of coupling characteristics to the first wavelength $\lambda_1$ of 1500 nm. Also, in the wavelength band of 1400 nm, which is relevant to the first Stokes frequency shift, shows low coupling efficiency to form an internal resonator.

As described in FIG. 5B, the long period optical fiber grating 35 shows permeability of −9 dB to the first wavelength $\lambda_1$ of 1500 nm and shows transmittance of −11 dB to the second wavelength $\lambda_2$ of 1480 nm, so it is understood that the long period optical fiber grating 35 has low transmittance to the first and second wavelength $\lambda_1$ and $\lambda_2$, simultaneously.

Figure 6:
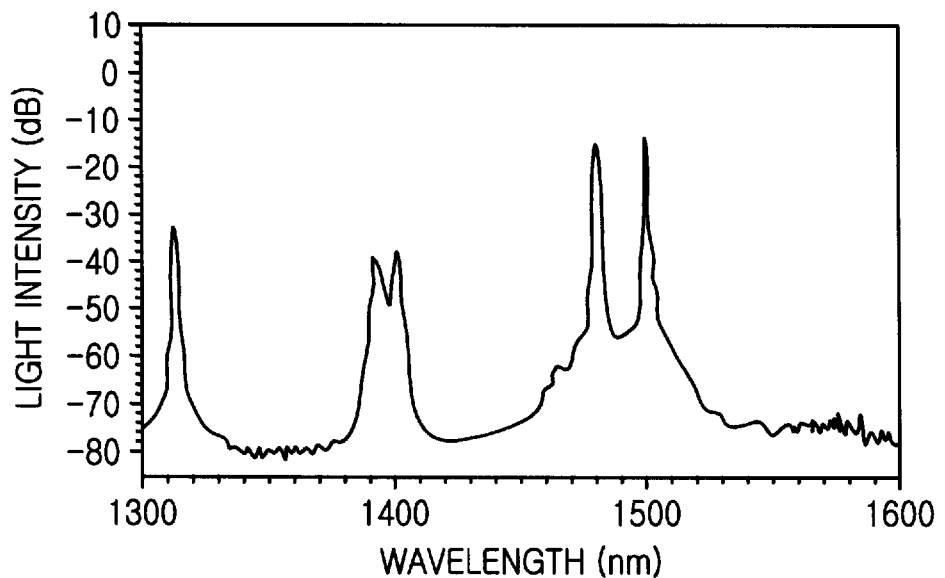
FIG. 6 is a graph showing a dual wavelength Raman laser outputting spectrum in accordance with a fifth embodiment of the present invention.

FIG. 6 is a graph showing a dual wavelength Raman laser outputting spectrum in accordance with a fifth embodiment of the present invention. The first Stokes frequency shifted wavelength is generated near the 1400 nm and the second Stokes frequency shifted wavelength, which is a laser outputting wavelength, is generated near the 1480 nm and 1500 nm wherein the 1480 nm and 1500 nm are selected by the optical grating.

Figure 7:
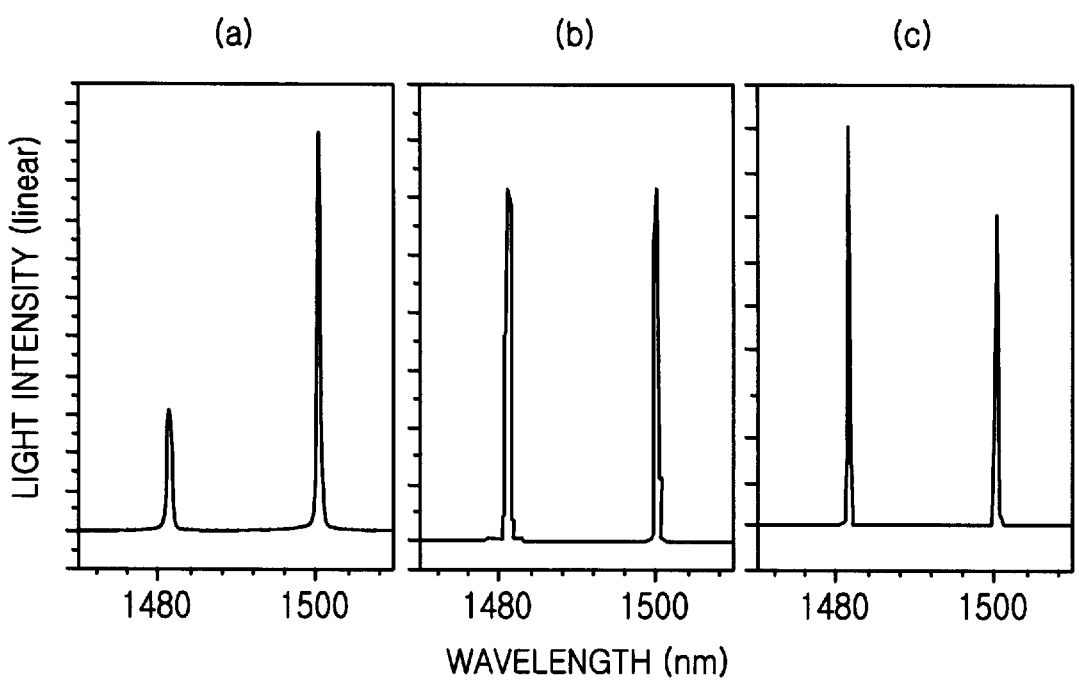
FIG. 7 is a graph showing comparison of relative power regulation spectrum of each wavelength in a dual wavelength Raman laser in accordance with a sixth embodiment of the present invention.

FIG. 7 is a graph showing comparison of relative power regulation spectrum of each wavelength in a dual wavelength Raman laser in accordance with a sixth embodiment of the present invention. In FIG. 7, it is understood that the relative power of the two wavelengths are regulated by changing reflecting characteristics of the fifth grating 32b which is located between the second active optical fiber 32 and the long period grating 35.

That is, power control to 1480 nm and 1500 nm oscillated wavelength is carried out independently.

The Raman laser oscillates two wavelength and controls relative power so it may be used to control an gain characteristics in a light amplifier which uses it to the pump light source.

In the present invention, the Raman laser of using the Stokes frequency shift is realized, but a Raman laser of higher order Stokes frequency shift can be applied. In this case, the laser can be operated within Raman gain region.

Moreover, an optical fiber laser which uses an active adding optical fiber of having large wavelength choice range can be used to simultaneously oscillate two wavelengths within the gain wavelength range of an active medium.

Also, when the dual wavelength laser is re-used as the pump light source of the light amplifier, it broadens a gain region of the amplifier and actively realizes gain flatness.

The dual wavelength optical fiber laser in the present invention is economical and a high outputting operation is possible and can easily regulate an outputting wavelength and a power. Also, it can obtain optical outputting of various wavelength bands and have stable laser operation.

While the present invention has been described with respect to the particular embodiments, it will be apparent to those skilled in the art that various changes and modifications may be made without departing from the scope of the invention as defined in the following claims.

What is claimed is:

1. A dual wavelength optical fiber laser, comprising:
   a first and a second optical fibers for utilizing as an optical active medium which generates a stimulated emission light by using a pump light source;
   two groups of short period optical fiber gratings for resonating each of a first and a second lights which are generated by the optical fibers and regulating reflecting characteristics according to the first and the second lights;
   a WDM optical fiber coupler for inputting a pump light from the pump light source to the optical fibers and outputting an operation laser light; and
   an optical device, connected between the optical fibers, for removing an interference in the first and the second lights of resonating.

2. A dual wavelength optical fiber laser, comprising:
   a first and a second optical fibers generating stimulated scattering by a pump light source;
   a WDM optical fiber coupler which inputs a pump wavelength to the optical fibers and outputs a laser operation wavelength;
   a first resonating means which is formed with the first optical fiber and a first group of a short period optical fiber grating, and thereby resonating a first wavelength light which is generated from the first optical fiber;
   a second resonating means which is formed with the second optical fiber and a second group of a short period optical fiber grating, and thereby resonating a second wavelength light which is generated from the second optical fiber;
   an interference removing means for removing an interference between the two resonating means by locating between the first and the second resonating means; and
   a pump light reflecting means which is connected to a laser outputting edge of the WDM optical fiber coupler to reflect a pump wavelength of the pump light source, then re-injected to the first and the second optical fibers.

3. The dual wavelength optical fiber laser as recited in claim 1, wherein the optical device uses a long period optical fiber grating which has high loss to the first and the second light beams.

4. The dual wavelength optical fiber laser as recited in claim 1, wherein the optical device uses a long period optical fiber grating which has high loss to the first and the second lights, simultaneously, and additionally uses long period optical fiber gratings which show high loss to the first light and to the second light, respectively.

5. The dual wavelength optical fiber laser as recited in claim 2, wherein the first group of the short period grating further comprising:
   a first period optical fiber grating which is located pump wavelength inputting edge of the WDM optical fiber coupler;
   a second short period optical fiber grating which is connected between the first optical fiber and the optical device; and
   a third short period optical fiber grating which is connected between the WDM optical fiber coupler and the second optical fiber.

6. The dual wavelength optical fiber laser as recited in claim 2, wherein the second group of the short period optical fiber grating further comprising:
   a fourth short period optical fiber grating which is located between the second optical fiber and the optical device; and
   a fifth short period optical fiber grating which is located between the second optical fiber and the WDM optical fiber coupler.

7. The dual wavelength optical fiber laser as recited in claim 2, wherein the first group of the short period optical fiber grating comprising a short period optical fiber grating which is carved directly to a couple region of the WDM optical fiber coupler.

* * * * *